(12) United States Patent
Guillemet et al.

(10) Patent No.: US 7,939,007 B2
(45) Date of Patent: May 10, 2011

(54) CERAMICS BASED ON LANTHANUM-DOPED BARIUM TITANATE, METHOD OF PREPARATION AND USES

(75) Inventors: Sophie Guillemet, Lacroix Falgarde (FR); Madona Boulos, Toulouse (FR); Bernard Durand, Fourquevaux (FR); Thierry Lebey, Lacroix Falgarde (FR); Quang Nguyen, Toulouse (FR)

(73) Assignees: Centre National de la Recherche Scientifique (CNRS), Paris (FR); Universite Paul Sabatier Toulouse III, Toulouse (FR)

( * ) Notice: Subject to any disclaimer, the term of this patent is extended or adjusted under 35 U.S.C. 154(b) by 139 days.

(21) Appl. No.: 12/226,420

(22) PCT Filed: Apr. 18, 2007

(86) PCT No.: PCT/EP2007/053804
§ 371 (c)(1),
(2), (4) Date: Feb. 23, 2009

(87) PCT Pub. No.: WO2007/118897
PCT Pub. Date: Oct. 25, 2007

(65) Prior Publication Data
US 2010/0027191 A1    Feb. 4, 2010

(30) Foreign Application Priority Data
Apr. 19, 2006  (FR) .................................... 06 03414

(51) Int. Cl.
*C04B 35/468*    (2006.01)
(52) U.S. Cl. .......................... 264/434; 264/483; 501/139
(58) Field of Classification Search .................. 501/139; 264/434, 483
See application file for complete search history.

(56) References Cited

U.S. PATENT DOCUMENTS

| 4,987,107 | A * | 1/1991 | Narumi et al. ................. 501/137 |
| 6,222,242 | B1  | 4/2001 | Konishi et al. |
| 6,863,742 | B2  | 3/2005 | Ohashi |
| 6,905,649 | B2  | 6/2005 | Zhan et al. |

OTHER PUBLICATIONS

Boulos et al., "Elaboration, characterization and electrical properties of lanthanum doped barium titanate ceramics obtained by SPS," *IX Conference & Exhibition of the European Ceramic Society*, Jun. 19-23, 2005, Portoroz, Slovenia.
Morrison et al., "Novel Doping Mechanism for Very-High Premittivity Barium Titanate Ceramics," *J. Am. Ceram. Soc.*, 81(7), pp. 1957-1960 (1998).
Morrison et al., "Characterization of Lanthanum-Doped Barium Titanate Ceramics Using Impedance Spectroscopy," *J. Am. Ceram. Soc.*, 84(3), pp. 531-538 (2001).

(Continued)

*Primary Examiner* — Karl E Group
(74) *Attorney, Agent, or Firm* — Foley & Lardner LLP

(57) ABSTRACT

The present invention relates to a method of preparing ceramics based on lanthanum-doped barium titanate, which comprises the following steps: (a) flash sintering of lanthanum-doped barium titanate powders; and (b) heat treatment of the material thus obtained, in an air atmosphere or in an oxidising atmosphere. The invention also relates to ceramics based on lanthanum-doped barium titanate, possessing a very high real part of the relative dielectric permittivity, and to their use for obtaining capacitors of high capacitance and high capacitance per unit volume for high-voltage withstand capability.

7 Claims, 3 Drawing Sheets

OTHER PUBLICATIONS

Takeuchi et al., "Preparation of Dense $BaTiO_3$ Ceramics with Submicrometer Grains by Spark Plasma Sintering," *J. Am. Ceram. Soc.*, 82(4), pp. 939-943, 1999.

Takeuchi et al., "Spark-plasma-sintering of fine $BaTiO_3$ powder prepared by a sol-crystal method," *J. Mat. Sci.*, vol. 36, 2001, pp. 2329-2334.

Guillemet-Fritsch et al., "Colossal Permittivity in Ultrafine Grain Size $BaTiO_{3-x}$ and $Ba_{0.95}La_{0.05}TiO_{3-x}$ Materials," *Adv. Mater.*, 2008, vol. 20, pp. 551-555.

Bernard et al., "Massive Nanostructures Comparative Investigation of FAPAS and SPS," *CN19-Colloque—Poudres et Matériaux Frittés*, Cherbourg, France, May 18-20, 2005.

Aymonier et al., "Production in Supercritical Fluid Media of Functional Nanoparticles for Ferroelectric Ceramics," *Colloque—Poudres et Matériaux Frittés 2005*, Cherbourg, France, May 18-20, 2005 (Abstract).

Bucher et al., "Properties of Coated Powders Compared to Those Equivalent Mixtures," *Lettre de LIFCO Industrie No. 1*, Sep. 2001 (Abstract).

Reveron et al., "Shaping and characterization of ferroelectric properties of powders prepared in fluid supercritical media," *Poudres et Matériaux Frittés 2005*, Cherbourg, France, May 18-20, 2005 (Abstract).

\* cited by examiner

CERAMICS BASED ON LANTHANUM-DOPED BARIUM TITANATE, METHOD OF PREPARATION AND USES

The present invention relates to a method of preparing ceramics based on lanthanum-doped barium titanate, ceramics thus obtained and their uses.

Electronic apparatus integrate more and more functionalities in increasingly restricted volumes. Thus, component size must constantly be reduced while maintaining, or better yet increasing, their properties. This is particularly the case with capacitors, in which it is desirable to have high capacitance per unit volume while maintaining high dielectric strength.

Barium titanate ($BaTiO_3$), which possesses high ferroelectric properties, is suitable for a number of applications. For example, it is of great interest for manufacturing multilayer capacitors, electro-optical devices or dynamic random access memory (DRAM). These materials are increasingly exposed to higher temperatures and voltages. Thus, there is a genuine need for higher performance materials based on barium titanate for manufacturing capacitors with higher capacitances and energy densities.

Much work has been undertaken to this end, in particular to identify the important factors that influence the ferroelectric properties of ceramics based on $BaTiO_3$. Thus, it has been demonstrated that the performance of these ceramics can be improved by controlling certain parameters such as $BaTiO_3$ grain size or homogeneity. The use of nano-sized $BaTiO_3$ considerably increases the real part of the relative dielectric permittivity of the ceramics obtained in comparison with materials prepared from micro-sized $BaTiO_3$ (U.S. Pat. No. 6,905,649). The preparation method also influences the parameters of the materials obtained. Thus, as compared to conventional sintering, several studies have demonstrated the advantage of the flash sintering technique (J. Mat. Sri., 36, 2001, 2329-2334), which avoids the exaggerated grain growth encountered during heating when using conventional techniques.

Flash sintering is a technique for molding materials, similar to conventional hot-press molding. In this technique, precursors are introduced into a matrix, for example graphite, which enables the use of uniaxial pressure during sintering. A continuous, continuous-pulsed, or alternating electrical current, applied via electrodes, passes through the conducting pressing matrix and, under suitable conditions, through the sample. Thus, the matrix acts as a source of heat which enables increased rates of temperature increase and freedom from the use of a traditional furnace. Objects thus sintered are obtained at lower temperatures, and sintering times are significantly shorter than those of conventional sintering methods. Moreover, they are highly compact and grain growth during sintering is strongly inhibited.

Another means for improving ceramic properties consists of adding a doping element to the material used. In the case of $BaTiO_3$, lanthanum has shown considerable influence on the electric and conduction properties of the ceramics obtained (J. Am. Ceram. Soc., 84, 3, 2001, 531-538), in particular by increasing the value of the real part of the relative dielectric permittivity and by decreasing the Curie temperature. Thus, the permittivities measured at 1 kHz and at the Curie temperature are roughly 10,000.

With the aim of further increasing the real part of the relative dielectric permittivity of ceramics, the applicant has demonstrated, in a surprising way, that the suitable selection of the procedures of their manufacturing process greatly improves the dielectric performance of the materials obtained.

Thus, the present invention relates to a method of preparation of ceramics based on lanthanum-doped barium titanate comprising the following steps:

(a) flash sintering of lanthanum-doped barium titanate powder, at a temperature between 950° C. and 1050° C., for a period of time between 1 min and 10 min, at a pressure of at least 50 MPa, (b) heat treatment of the material thus obtained, at a temperature between 800° C. and 900° C., for a period of time between 2 h and 24 h, in an atmosphere of air or in an oxidizing atmosphere.

In an advantageous embodiment of the method according to the invention, step (a) is carried out at a temperature of 1050° C. for 3 minutes with a current of 370 A. This step is performed in a primary vacuum or in a neutral atmosphere, for example in argon or nitrogen. Preferentially, it is performed in a primary vacuum.

In another advantageous embodiment of the method according to the present invention, the sintering temperature is reached using a temperature ramp of 50° C. per minute, starting at room temperature, i.e., at a temperature of roughly 25° C.

The second step of the method according to the invention is necessary in order to remove carbon traces arising from contamination of the matrix and to readjust the oxygen content of the sample. The specific heat treatment conditions mentioned above not only achieve this aim, they also influence the electric properties of the ceramics obtained, and in particular giving them an insulating character. This step is carried out in an oxidizing atmosphere or, alternatively, in an atmosphere of air. The diffusion of oxygen during this step, which appears to lead to a heterogeneous distribution, most importantly makes it possible to obtain values for the real part of the relative dielectric permittivity that have not been observed heretofore. The ceramics obtainable by the method according to the invention possess a real part of the relative dielectric permittivity higher than 100,000. Specifically, this value, measured at 1 kHz, is 270,000 over a wide range of temperatures.

In a preferred embodiment of the above-mentioned method, step (b) is carried out at a temperature of 850° C., for 2 hours, in an atmosphere of air.

The starting material used in the method according to the invention is lanthanum-doped barium titanate ($BaTiO_3$). This material can be represented by the formula:

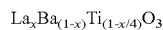

$$La_xBa_{(1-x)}Ti_{(1-x/4)}O_3$$

wherein $0<x<0.14$.

In a preferred embodiment of the invention, x is between 0.04 and 0.06, and specifically the value of x is 0.048.

This starting material can be prepared by conventional soft chemistry techniques or by a solid-solid route.

For carrying out the present invention soft chemistry methods are preferred, including methods such as coprecipitation and hydrothermal synthesis. Coprecipitation is based on a double decomposition reaction between a metallic salt and an alkaline oxalate, or between a metallic salt and oxalic acid. Hydrothermal synthesis directly yields crystallized oxide powder after a treatment under autogenous pressure. Barium titanate can be synthesized from a basic solution of titanium trichloride, barium chloride and lanthanum chloride. In certain cases, the presence of a sequestering agent is essential to dissolve the two simple oxides in the same pH range and to precipitate the final mixed oxide. The oxalate powder thus obtained is then calcined to yield the corresponding oxides.

In an advantageous embodiment of the invention, the method of coprecipitating metallic salts and oxalic acid in an organic solvent is selected. More specifically, the precursor salts are barium dichloride salts ($BaCl_2$, $2H_2O$) and titanium trichloride ($TiCl_3$) salts. The lanthanum precursor is lanthanum trichloride ($LaCl_3$, $7H_2O$), which is added to the metal chloride solution. The oxalate powder is prepared by coprecipitating the metal chloride aqueous solution with an ethanolic solution of oxalic acid. Advantageously, maturation time is 5 h 30. A subsequent calcining step yields the barium titanate powder used in the method according to the invention. This step is carried out at a temperature of 850° C., for example. Advantageously, the diameter of the barium titanate powder used is between 10 nm and 500 nm.

The present invention also relates to ceramics obtainable by the above-mentioned method. As indicated above, the dielectric properties of these materials are improved. This is most notable in the case of the real part of the relative dielectric permittivity, which reaches values that have not been observed heretofore.

Thus, the invention relates to ceramics based on lanthanum-doped barium titanate that possess a real part of the relative dielectric permittivity higher than 100,000, measured at 1 kHz. In a preferred embodiment, this value, measured at 1 kHz, is 270,000.

Moreover, measured loss factors, which characterize total energy dissipation, are relatively low, which provides an additional advantage. In particular, they are between 0.1 and 0.2 at a temperature varying between −100° C. and +150° C., at a frequency of 1 kHz.

The method according to the invention also controls ceramic grain growth. Thus, the invention also relates to ceramics based on barium titanate whose grain size is smaller than 100 nm, preferentially smaller than 150 nm.

The invention also relates to ceramics based on lanthanum-doped barium titanate characterized by the absence of ferroelectric behavior in the temperature range between −100° C. and +200° C.

As mentioned in the introduction, ceramics based on barium titanate are widely used to manufacture various passive electrostatic or electro-optical components. In particular, with respect to passive components, said ceramics can be used in single layer or multilayer capacitors. The use of ceramics according to the invention makes it possible, in a single step, to achieve capacitance values per unit volume that are identical, if not higher, than those of multilayer capacitors requiring many technological steps, most notably tape casting or internal metallization.

Thus, the invention also relates to capacitors that contain ceramics based on the lanthanum-doped barium titanate according to the invention. Firstly, monolayer capacitors were obtained most notably by metallization of the ceramics thus obtained by serigraphy of silver electrodes, by cathode sputtering of a metal, or by any other method that creates electrical contacts. Said capacitors have high capcitances per unit volume, equal to or greater than those measured in commercially available capacitors. In particular, the capacitance value of the inventive capacitors is at least 40 nF at 1 kHz and at room temperature, i.e., 25° C., for a thickness of 1.5 mm and a surface area of 0.2 $cm^2$. More particularly, a capacitance per unit volume of 1300 $nF/cm^3$ is obtained for a thickness of 1.5 mm, with a withstand capacity of roughly 1 kV or higher.

The invention also relates to the use of the ceramics such as described above to manufacture integrated passive components, most notably monolayer or multilayer capacitors.

The following examples serve to illustrate the invention but are in no way limiting.

EXAMPLE 1

Preparation of Lanthanum-doped Barium Titanate Powder

The following metal precursor metallic salts are used:

Barium chloride with two water molecules ($BaCl_2$, $2H_2O$) of RP NORMAPUR® for analysis (PROLABO): w=248.28 g/mol, 99.0% pure.

15% titanium (III) chloride in an aqueous solution of RP NORMAPUR® for analysis (PROLABO): w=154.26 g/mol, d=1.2.

Lanthanum chloride with seven water molecules of RP NORMAPUR® for analysis (PROLABO): w=371.37 g/mol.

Lanthanum chloride (in the desired proportion) is added to a solution of titanium chloride (0.125 mol) and barium chloride (0.125 mol). The mixture is diluted to 800 ml with distilled water to constitute solution 1.

Oxalic acid (47.53 g) is dissolved in 5 l of ethanol to constitute solution 2.

The two solutions are mixed under a vent hood for 5 h 30 to coprecipitate the mixed oxalates. After centrifuging, filtering, washing in ethanol and drying at 100° C. overnight, the powder thus obtained is mixed and calcined at a temperature of 850° C. to yield lanthanum-doped barium titanate of formula: $Ba_{0.952}La_{0.048}Ti_{0.988}O_3$.

Figure 1A:
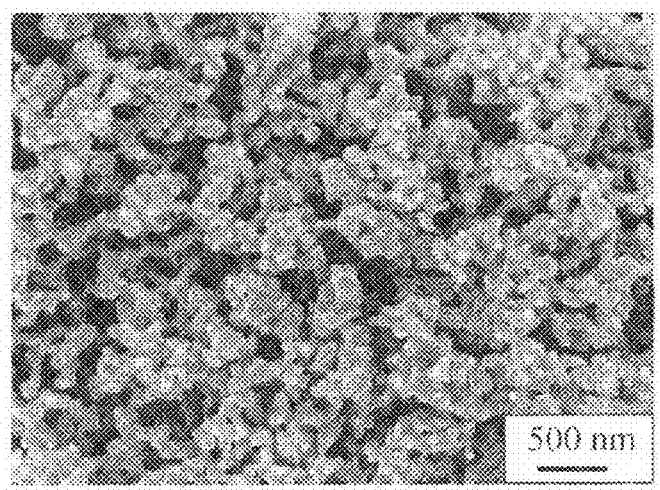
FIG. 1A: FEG-SEM micrograph of powder of composition $Ba_{0.952}La_{0.048}Ti_{0.988}O_3$ according to the invention.

The samples obtained are observed using a field effect scanning electron microscope (JEOL 6700 F). Powder morphology is visible in FIG. 1A.

EXAMPLE 2

Preparation of Ceramics

The flash sintering step is carried out using a spark plasma sintering (SPS) apparatus (SUMBVIOTO model SPS2080, Japan).

The lanthanum-doped barium titanate powder from example 1 (0.9 g) is placed in an 8 mm diameter graphite matrix and an electrical current of 370 A is applied under 50 MPa of pressure. The sample is then heated to 1050° C. with a heating rate of 50° C./min. After 3 min at this temperature range, the electrical current and pressure on the sample are cut. After an additional minute, the temperature drops to 600° C.

The ceramics thus obtained are then subjected to an 850° C. heat treatment for 2 h in an atmosphere of air.

The reproducibility of the method according to the invention was verified by producing two samples from the same powder, under identical operating conditions.

Measurement of the Apparent Density of the Ceramics

Hydrostatic weighing in water is used to determine the apparent density of the ceramics. The electronic balance used is a Kern ARJ220-4 M and measures weight in a range between 0 g and 220 g (accuracy of $10^{-4}$ g). The densities are given by the formula:

$d=m_{air}/(m_{air}-m_{water})$, wherein $m_{air}$ is the mass in air and $m_{water}$ is the mass in water.

Densifications are expressed as a percent of theoretical density.

Results

The densification of the two ceramics obtained is 96.1% for sample 1 and 97.2% for sample 2.

Figure 1B:
FIG. 1B: FEG-SEM micrographs of the surface of the ceramics obtained according to the invention.
Figure 1B:
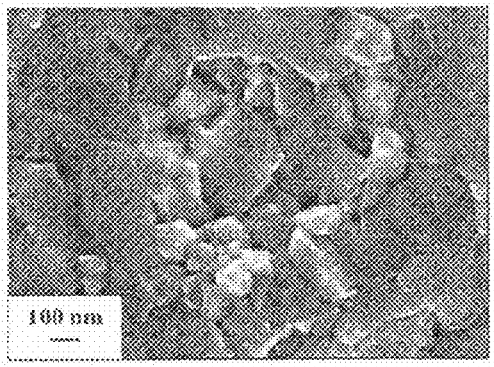

Sample morphology is observed using a field effect scanning electron microscope (JEOL 6700 F). The surface of each sample is represented in FIG. 1B.

In each case particle size is smaller than 150 nm.

Determination of the Real Part of the Relative Dielectric Permittivity $\in'_r$

To determine the real part of the relative dielectric permittivity and the loss factor, a simple model is generally used wherein the dielectric is compared to an imperfect capacitor represented by a perfect capacitance of finite dimension of surface S and thickness e and by a resistance. This yields:

$$\varepsilon'_r = \frac{C \cdot e}{\varepsilon_0 \cdot S}$$

and $$tg\delta = \frac{1}{R \cdot C\omega} = \frac{\varepsilon''_r}{\varepsilon'_r}$$

wherein $\in_0$ is the permittivity of the vacuum, $\in'_r$ is the real part of the relative dielectric permittivity, $\in''_r$ is the imaginary part of the relative dielectric permittivity, R is the resistance value, C is the capacitance value, and ω is the pulse frequency determined according to the formula ω=2 πf, wherein f is the signal frequency used.

The relative complex permittivity $\in^*_r$ is given by the formula $\in^*_r = \in'_r - j\in''_r$.

The dielectric loss (also referred to as loss factor) is represented by the magnitude of tgδ. It characterizes the total dissipation of dielectric energy when an electric field is applied. From an experimental point of view, these magnitudes are determined by measuring capacitance C and resistance R. Taking this measurement at variable frequencies and temperatures extends the analysis and leads to a better understanding of electrical/structural property relationships.

Measurements are taken using the following devices:

1. System I:

An impedance measuring bridge (HP 4284A type) with a frequency range of 20 Hz to 1 MHz, A gain and phase analyzer (HP 4194A) with a frequency range of 40 Hz to 110 MHz, A chamber with an adjustable temperature range of −75° C. to +160° C., A PC to automate the measurement process.

2. System II:

A T.A. INSTRUMENT DEA 2970 with a frequency range of 0.1 Hz to 100 kHz,

A chamber with an adjustable temperature range of −200° C. to 160° C.,

A PC to automate the measurement process.

Figure 2A:
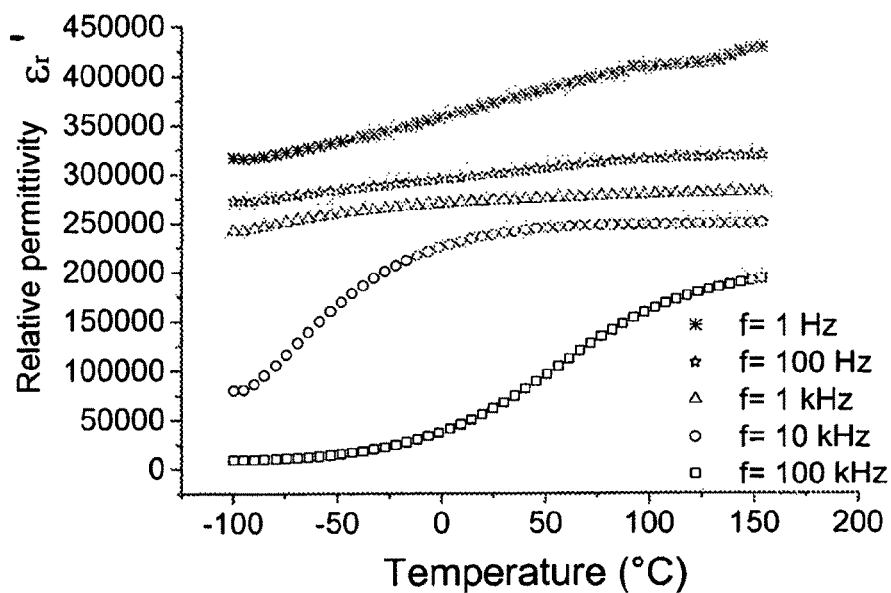
FIG. 2A: Measurement of the real part of the relative dielectric permittivity over a temperature range of −100° C. to +150° C., at various frequencies.
Figure 2B:
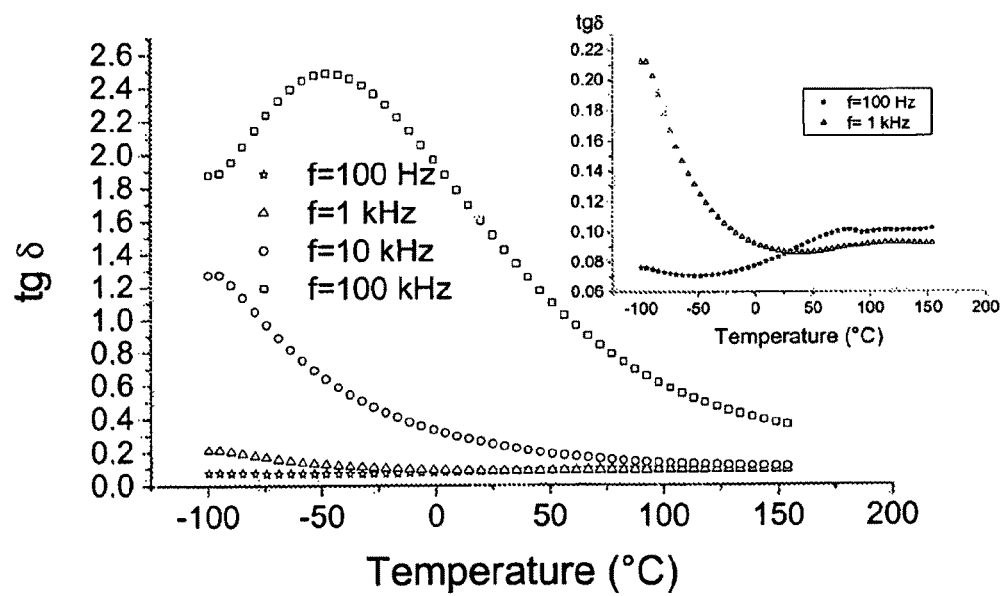
FIG. 2B: Measurement of loss factors as a function of temperature, at various frequencies.
Figure 3:
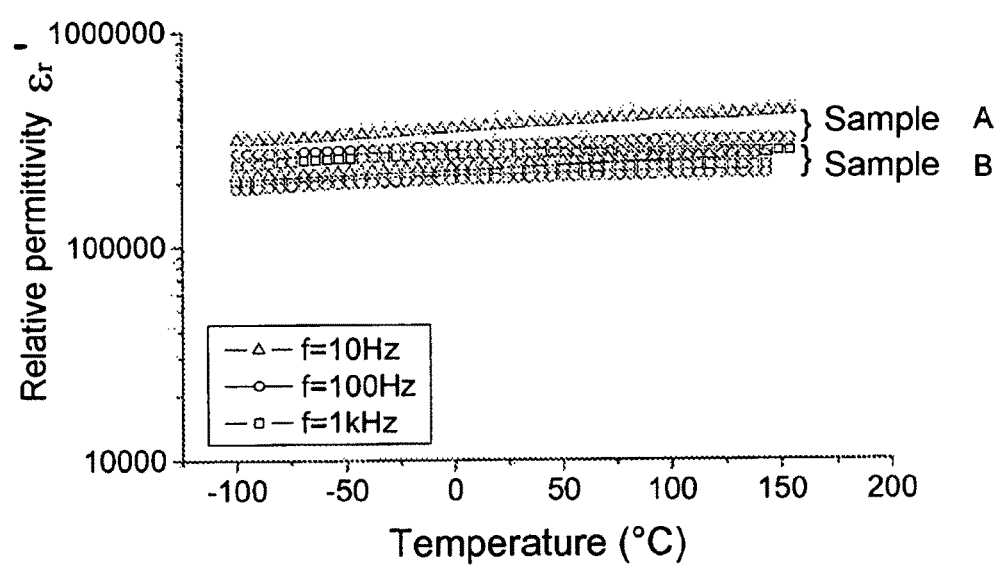
FIG. 3: Illustration of the reproducibility of the method according to the invention by measuring the real part of the relative dielectric permittivity for two samples, A and B, under the same conditions.

Results:

The results for the measurements of the real part of the relative dielectric permittivity are presented in FIG. 2A and for measurements of loss factors in FIG. 2B. The reproducibility of the ceramics manufacturing process according to the invention is illustrated in FIG. 3.

The measured values of the real part of the relative dielectric permittivity are very high at frequencies between 1 Hz and 10 kHz, across all temperatures. Moreover, these values are virtually constant for the first three frequencies studied.

The loss variation (tgδ) observed indicates a minimum loss of energy over the range of temperatures and frequencies studied.

The invention claimed is:

1. A method of preparation of ceramics based on lanthanum-doped barium titanate comprising the following steps:
   (a) flash sintering of lanthanum-doped barium titanate powder, at a temperature between 950° C. and 1050° C., for a period of time between 1 min and 10 min, at a pressure of at least 50 MPa,
   (b) heat treatment of the material thus obtained, at a temperature between 800° C. and 900° C., for a period of time between 2 h and 24 h, in an atmosphere of air or in an oxidizing atmosphere.

2. The method of preparation according to claim 1, wherein the step (a) is carried out at a temperature of 1050° C. for 3 minutes with a current of 370 A.

3. The method of preparation according to claim 1, wherein the sintering temperature in step (a) is reached using a temperature ramp of 50° C. per minute, starting at room temperature.

4. The method of preparation according to claim 1, wherein the step (b) is carried out at a temperature of 850° C., for 2 hours, in an atmosphere of air.

5. The method of preparation according to claim 1, wherein the lanthanum-doped barium titanate powder has the formula $La_xBa_{(1-x)}Ti_{(1-x/4)}O_3$, wherein x=0.048.

6. The method of preparation according to claim 1, wherein the lanthanum-doped barium titanate powder is synthesized by soft chemistry.

7. The method of preparation according to claim 6, wherein the lanthanum-doped barium titanate powder is obtained by:
   coprecipitating $TiCl_3$ and $BaCl_2.2H_2O$ with $LaCl_3.7H_2O$ in the presence of an ethanolic solution of oxalic acid for 5 h 30 min, then
   calcining at 850° C.

* * * * *